(12) United States Patent
Chang

(10) Patent No.: US 7,530,178 B2
(45) Date of Patent: May 12, 2009

(54) MEASURING TAPE DEVICE WITH FUNCTION OF MUSIC PLAYER

(76) Inventor: Ming-Chi Chang, 235 Chung-Ho Box 8-24, Taichung Hsien (TW)

( * ) Notice: Subject to any disclaimer, the term of this patent is extended or adjusted under 35 U.S.C. 154(b) by 0 days.

(21) Appl. No.: 11/729,811

(22) Filed: Mar. 30, 2007

(65) Prior Publication Data

US 2008/0235974 A1 Oct. 2, 2008

(51) Int. Cl.
*G01B 3/10* (2006.01)
(52) U.S. Cl. .......................................... 33/760; 33/761
(58) Field of Classification Search .................. 33/755, 33/760, 761, 768, 770
See application file for complete search history.

(56) References Cited

U.S. PATENT DOCUMENTS

| 5,230,159 | A | * | 7/1993 | Lipsey | 33/760 |
|---|---|---|---|---|---|
| 5,448,837 | A | * | 9/1995 | Han-Teng | 33/761 |
| 5,691,923 | A | * | 11/1997 | Adler et al. | 702/164 |
| 5,802,732 | A | * | 9/1998 | Malone | 33/768 |
| 6,631,098 | B2 | * | 10/2003 | Chang et al. | 369/7 |
| 6,799,226 | B1 | * | 9/2004 | Robbin et al. | 710/15 |
| 6,868,571 | B1 | * | 3/2005 | Fischer et al. | 7/164 |
| 7,363,723 | B1 | * | 4/2008 | Peterson | 33/760 |
| 7,370,433 | B1 | * | 5/2008 | Caraway | 33/768 |
| 2004/0254661 | A1 | * | 12/2004 | Ng et al. | 700/94 |
| 2006/0217827 | A1 | * | 9/2006 | Hsu et al. | 700/94 |
| 2007/0130785 | A1 | * | 6/2007 | Bublitz et al. | 33/290 |
| 2008/0064339 | A1 | * | 3/2008 | Cavalier | 455/66.1 |

FOREIGN PATENT DOCUMENTS

| GB | 2146623 A | * | 4/1985 |
|---|---|---|---|
| JP | 58136110 A | * | 8/1983 |
| JP | 60007301 A | * | 1/1985 |
| JP | 63298111 A | * | 12/1988 |
| WO | WO 2007057656 A1 | * | 5/2007 |

\* cited by examiner

*Primary Examiner*—R. Alexander Smith

(57) ABSTRACT

A measuring tape device with a function of a music player comprises a measure tape casing having a power supply therein; a digital player installed in the casing; the digital player including a control panel, a digital processor, an earphone slot, a USB slot and a memory card slot. The digital processor is installed on the control panel for storing and processing speech data; the control panel serves to control the digital processor; the control panel has buttons for playing, stopping, pausing, volume-adjusting, song-editing; and the earphone slot and USB slot are installed at an upper surface of the casing; the memory card slot is installed at a side of the measure tape device opposite to the side installing the measure tape.

1 Claim, 4 Drawing Sheets

MEASURING TAPE DEVICE WITH FUNCTION OF MUSIC PLAYER

FIELD OF THE INVENTION

The present invention relates to measure tapes, and particularly to a measuring tape device with a function of a music player, which combines a digital player to a measure tape device so as to have the function of measurement and speech playing.

BACKGROUND OF THE INVENTION

Measure tapes are widely used in working for measuring sizes of an object. However the memory tapes are purely used in working. In some improvements, the measure tape is installed with function of illumination so as to illuminate the work environment to assist the work of users and thus the working efficiency is increased and the user is unnecessary to carry any lamp for illumination.

However in many research results, the music is helpful to the work of the workers. In many status, the worker works and also hear music, which presents a higher efficiency than those without hearing music. However in most conditions, the work places have not been equipped with music players so that the user must carrying with a portable music player, but this is inconvenient.

SUMMARY OF THE INVENTION

Accordingly, the primary object of the present invention is to provide a measuring tape device with a function of a music player, which combines a digital player to a measure tape device so as to have the function of measurement and speech playing.

To achieve above objects, the present invention provides a measuring tape device with a function of a music player which comprises a measure tape casing having a power supply therein; a digital player installed in the casing; the digital player including a control panel, a digital processor, an earphone slot, a USB slot and a memory card slot; and wherein the digital processor is installed on the control panel for storing and processing speech data; the control panel serves to control the digital processor; the control panel has buttons for playing, stopping, pausing, volume-adjusting, song-editing; and the earphone slot and USB slot are installed at an upper surface of the casing; the memory card slot is installed at a side of the measure tape device opposite to the side installing the measure tape.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
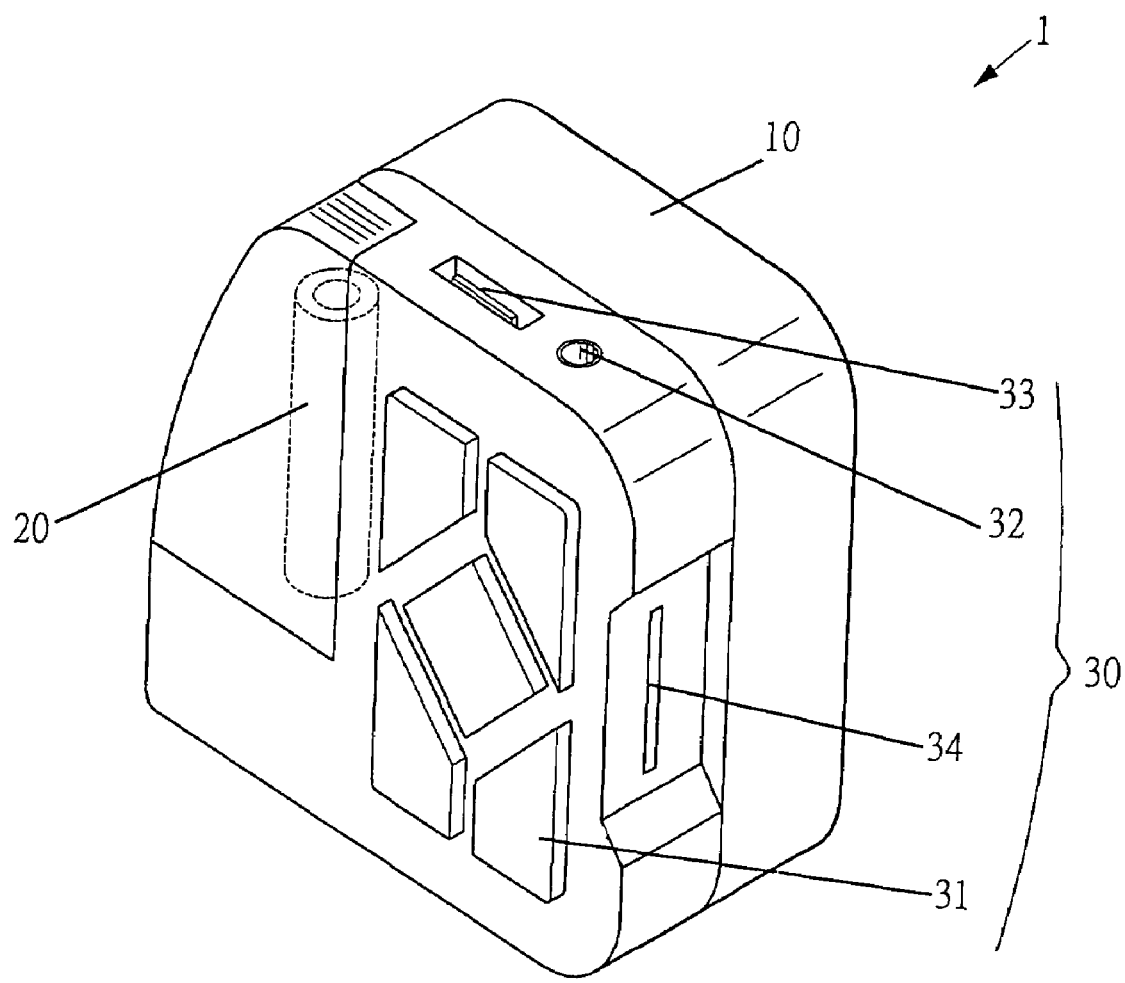
FIG. 1 is a perspective view of the measuring tape device with a function of a music player of the present invention.
Figure 2:
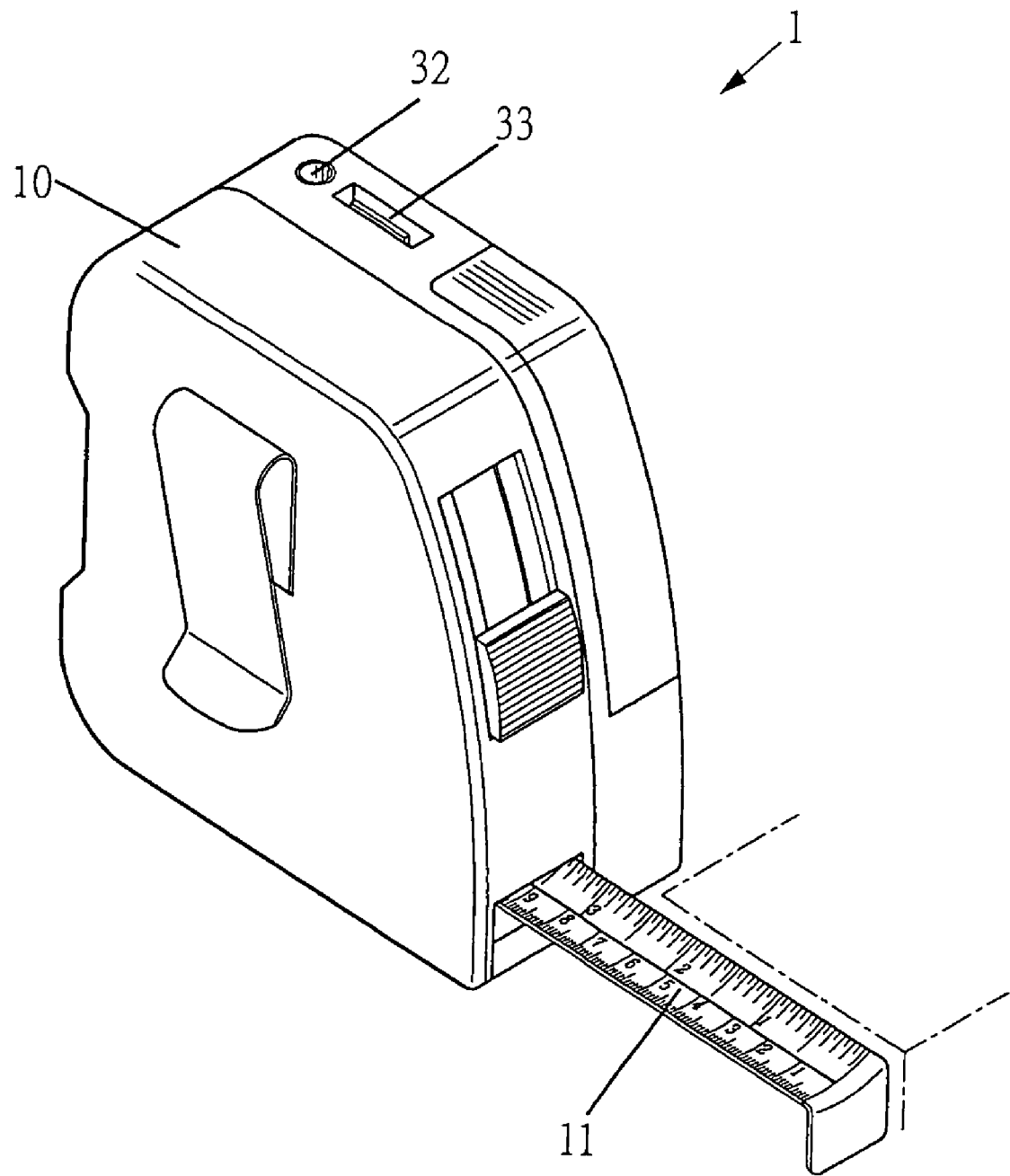
FIG. 2 is a schematic view about the measuring tape device with a function of a music player of the present invention.

Referring to FIGS. 1 and 2 of the present invention. The digital measure tape 1 of the present invention is illustrated. The present invention has the following elements.

A measure tape casing 10 has a power supply 20 therein.

A digital player 30 is installed in the casing 10. The digital player 30 includes a control panel 31, a digital processor 311, an earphone slot 32, a USB slot 33 and a memory card slot 34.

The digital processor 311 is installed on the control panel 31 for storing and processing speech data. The control panel 31 serves to control the digital processor 311. The control panel 31 has buttons for playing, stopping, pausing, volume-adjusting, song-editing, etc.

The earphone slot 32 and USB slot 33 are installed at an upper surface of the casing 10. An earphone 321 can be inserted into the earphone slot 32 for hearing music. A USB plug 331, can be inserted into the USB slot 33 for providing other auxiliary function.

The memory card slot 34 is installed at a side of the measure tape device 10 opposite to the side installing the measure tape 11. The memory card slot 34 serves to receive a memory card 341 so as to expand the function of the measure tape device.

The operation of the present invention will be described herein with reference to FIGS. 2 to 5, if the digital player 30 is not used, the present invention is used as measuring tool. The measure tape 11 is pulled out for measuring a length of an object (referring to FIG. 2). Furthermore, the present invention can be used as a MP3. Because the structure of the present invention is compact which can be hung upon the waist or pocket for carrying conveniently.

Figure 3:
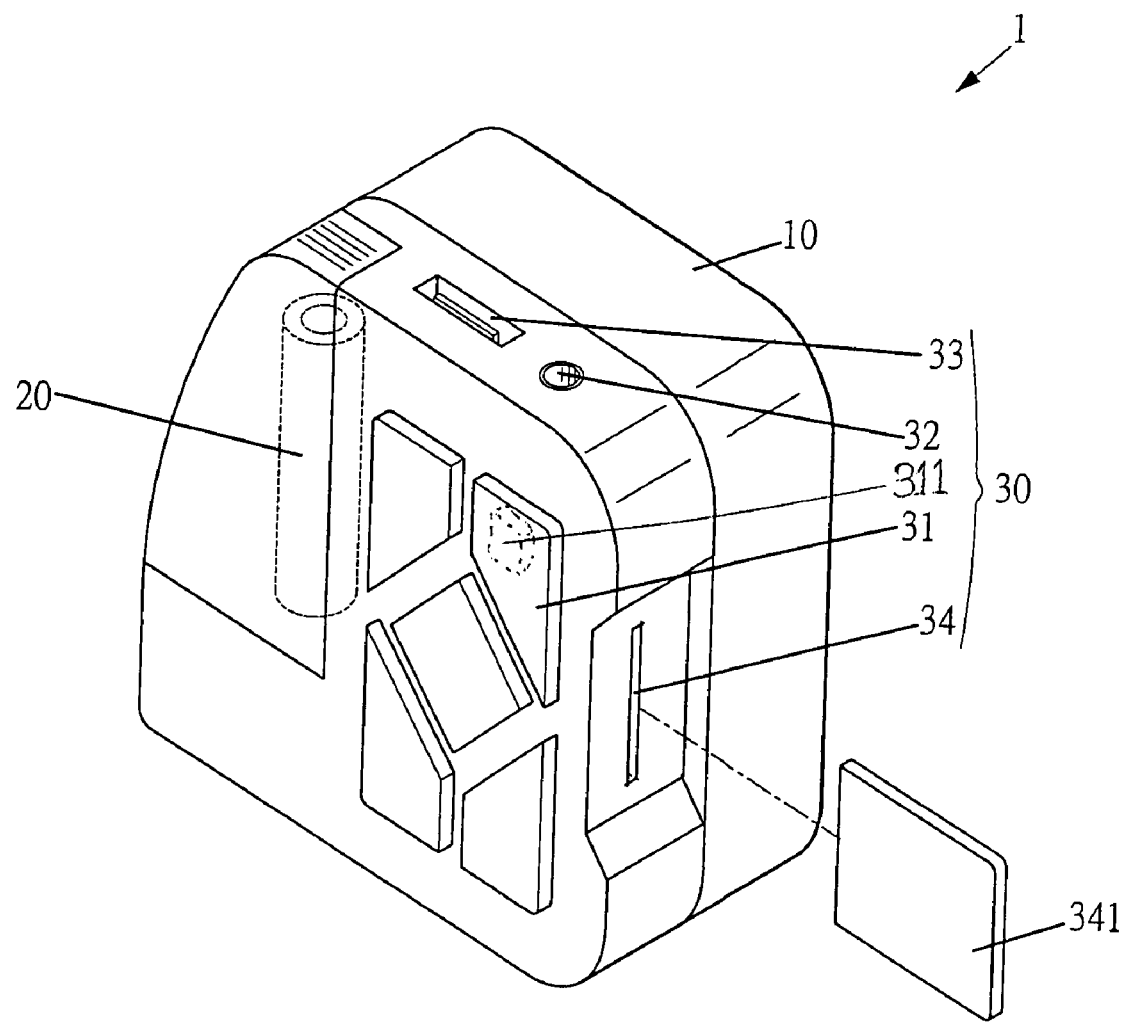
FIG. 3 is a schematic view showing that the present invention is connected to a memory card.

With referring to FIG. 3, the memory card 341 inserted into the memory card slot 34 can record the speech about Japanese, English, etc. for training the languages, or the memory card 341 is recorded with several songs which can be played without needing to selections the songs desired.

Figure 4:
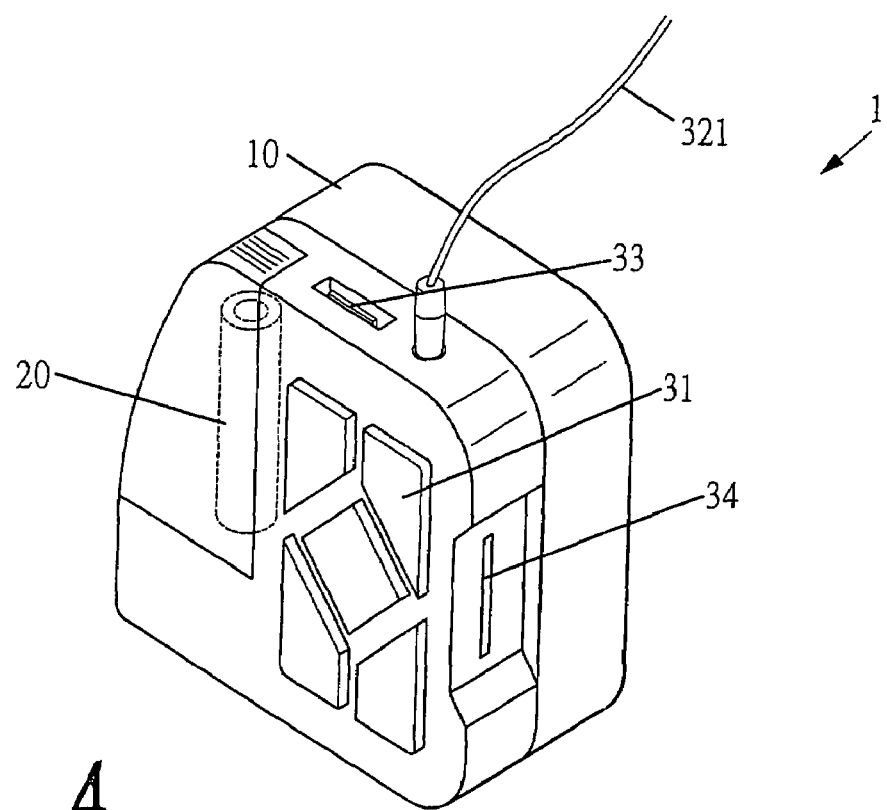
FIG. 4 is a schematic view showing that the present invention is connected with an earphone.
Figure 5:
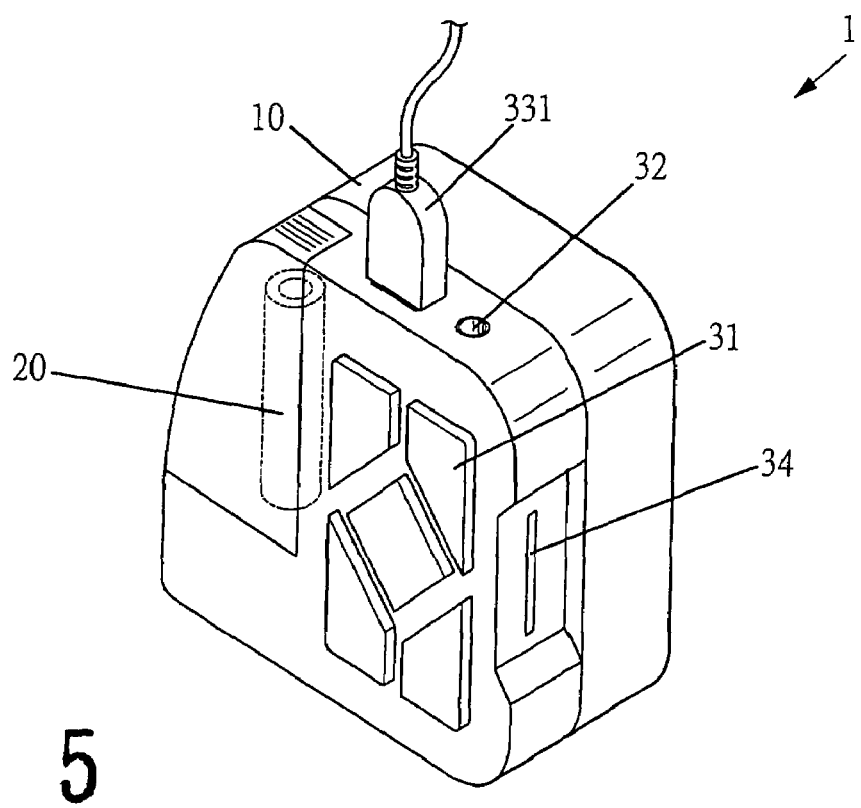
FIG. 5 is a schematic view showing that the present invention is used through the use of a USB slot.

Referring to FIG. 4, in use of the digital player 30 of the present invention, it is only necessary to connect the earphone 321 to the earphone slot 32 and the earphone 321 wears upon the ear of user so that the user can hear music and isolate the interference from noises. Thus the user will feel pleasure in working and thus the working efficiency is increased Besides, when it is desired to update the speech data in the digital player 30, as illustrated in FIG. 5, the USB plug 331 is inserted into the USB slot 33 and is connected to a computer so that the speech data in the digital processor 311 can be changed. Furthermore, a USB plug 331 can be inserted to the USB slot 33 for supplying of power.

Furthermore, in the present invention, the forms of the control panel 31 and the power supply 20 are not confined to those illustrated in the drawings of the present invention.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A measuring tape device with a function of a music player comprising:
   a casing;
   a memory card slot installed in the casing, the memory card slot served to receive a memory card so as to expand the function of the measuring tape device;
   a digital player installed in the casing;
   a control panel having a plurality of buttons disposed on the casing for controlling the digital player;
   an earphone slot defined in the casing for receiving an earphone
   a power supply is installed in the casing for providing energy to the measuring tape device, the power supply being reusable and disposable; and
   a USB slot installed on a surface of the casing for connected to an extra power source or a data source.

* * * * *